United States Patent
Mitake et al.

(10) Patent No.: US 11,801,647 B2
(45) Date of Patent: Oct. 31, 2023

(54) MODELING METHOD FOR A WORKPIECE AND THE WORKPIECE

(71) Applicants: SOLIZE Corporation, Tokyo (JP); Honda Motor Co., Ltd, Tokyo (JP)

(72) Inventors: Jun Mitake, Tokyo (JP); Tsuneo Endo, Wako (JP); Yuta Kurosawa, Wako (JP)

(73) Assignee: SOLIZE CORPORATION, Tokyo (JP)

( * ) Notice: Subject to any disclaimer, the term of this patent is extended or adjusted under 35 U.S.C. 154(b) by 7 days.

(21) Appl. No.: 17/701,734

(22) Filed: Mar. 23, 2022

(65) Prior Publication Data

US 2022/0305737 A1 Sep. 29, 2022

(30) Foreign Application Priority Data

Mar. 25, 2021 (JP) .................. 2021-052438

(51) Int. Cl.
| | |
|---|---|
| *B33Y 10/00* | (2015.01) |
| *B29C 64/40* | (2017.01) |
| *B29C 64/35* | (2017.01) |
| *B33Y 40/00* | (2020.01) |
| *B29C 64/188* | (2017.01) |
| *B33Y 80/00* | (2015.01) |

(52) U.S. Cl.
CPC ............ *B29C 64/40* (2017.08); *B29C 64/188* (2017.08); *B29C 64/35* (2017.08); *B33Y 10/00* (2014.12); *B33Y 40/00* (2014.12); *B33Y 80/00* (2014.12)

(58) Field of Classification Search
CPC ... B29C 64/106; B29C 64/124; B29C 64/245; B29C 64/35; B29C 64/40; B29C 64/00
See application file for complete search history.

(56) References Cited

U.S. PATENT DOCUMENTS

| | | | | |
|---|---|---|---|---|
| 2003/0203158 | A1* | 10/2003 | Farnworth | B33Y 30/00 |
| 2004/0226620 | A1* | 11/2004 | Therriault | B01F 25/433 |
| | | | | 137/825 |
| 2007/0029693 | A1* | 2/2007 | Wigand | B29C 33/40 |
| | | | | 425/375 |
| 2015/0343705 | A1* | 12/2015 | Chen | B29C 64/35 |
| | | | | 428/34.1 |
| 2018/0236616 | A1* | 8/2018 | Garay | C30B 29/66 |

(Continued)

FOREIGN PATENT DOCUMENTS

| | | |
|---|---|---|
| JP | 2020172876 A | 10/2020 |
| JP | 2021021102 A | 2/2021 |
| JP | 2021031756 A | 3/2021 |

*Primary Examiner* — Joseph S Del Sole
*Assistant Examiner* — Margaret B Hayes
(74) *Attorney, Agent, or Firm* — Bayramoglu Law Offices LLC

(57) ABSTRACT

A modeling method for a workpiece and the workpiece are provided. When the workpiece, at least a part of the workpiece has a hollow region and two or more openings linking an inside and the outside of the hollow region, is additively manufactured, a temporary closure to block at least one of the two or more openings of the hollow region is manufactured at a same time as laminating of a wall section of the hollow region. A peripheral edge of the temporary closure joined to the wall section, and the temporary closure has a flow hole allowing a fluid to flow in or out of the hollow region, then the temporary closure is removed after the fluid has flowed in or out.

19 Claims, 6 Drawing Sheets

(56) References Cited

U.S. PATENT DOCUMENTS

| | | | |
|---|---|---|---|
| 2018/0370136 A1* | 12/2018 | Stadlmann | B29C 64/124 |
| 2019/0039137 A1* | 2/2019 | Hildreth | B28B 11/00 |
| 2022/0032506 A1* | 2/2022 | Salfetnikov | B29C 64/40 |

* cited by examiner

MODELING METHOD FOR A WORKPIECE AND THE WORKPIECE

CROSS REFERENCE TO THE RELATED APPLICATIONS

This application is based upon and claims priority to Japanese Patent Application No. 2021-052438, filed on Mar. 25, 2021, the entire contents of which are incorporated herein by reference.

TECHNICAL FIELD

The present invention relates to an additive manufacturing method for a workpiece by a 3D printer and the workpiece modeled by the additive manufacturing method, and a method for facilitating removal of modeling material and pressure test.

BACKGROUND

Today, modeling methods using 3D printer have developed. The methods are commonly applied for production of prototypes and mass-produced products at manufacturing sites.

Additive manufacturing method for producing 3D workpieces by laminating thin-sliced two-dimensional layers one by one based on three-dimensional CAD data is one of the most common.

Among additive manufacturing methods, a powder sintering additive manufacturing method refers to a modeling of a 3 D shape by laminating thermoplastic resin powder or alloy powder over a modeling stage, layer by layer, then manufacture a 3 D shape as a result of melting and sintering the powder using laser or electric discharge. Further, the method is capable of modeling overhanging shapes or the like without using a support member, compared with a fused deposition modeling method or a stereolithography method. The powder sintering additive manufacturing method is suitable for production of a workpiece having a complex shape, such as a turbine or heat exchanger.

Besides, for a workpiece having a complex shape, a dedicated jig such as a rubber stopper, had to be prepared for the purpose of removal of unsintered powder remained in an internal space due to a complex shape, and temporarily blocking the openings during a pressure test.

The following conventional techniques are known as methods for removing residual powder and internal support member remained inside.

Japanese Patent Application Laid-Open No. 2021-31756 discloses, with respect to a three-dimensional modeling method for manufacturing three-dimensional objects by irradiating an electron beam to a powder material to melt it, a technique including a manufacturing process for modeling a support member including a rod-shaped member at a lower position of the object, an extraction process of extracting the rod-shaped member from the modeled support, and a removal process of removing the support member by blowing in the air and granules into a space that is formed by extracting the rod-shaped member.

Furthermore, Japanese Patent Application Laid-Open No. 2021-21102 discloses a production method for a metal formed object having a porous structure that is densely provided with through holes penetrating in a thickness direction. The method includes: a resin material supply process for supplying liquid containing resin material in a plurality of places of the substrate while spacing in the intersecting two directions; a mold forming process for forming a mold having a plurality of columnar structures extending from the substrate by implementing a curing process for curing the liquid; a sintered material supplying process for supplying materials to be sintered to the mold; a removal process for removing the substrate; a degreasing process of degreasing the columnar structures; and a sintering process for sintering the sintered materials.

Japanese Patent Application Laid-Open No. 2020-172876 discloses, a technique for improving the performance of an impeller when the shape of the flow path of the impeller is complex, including a structure modeling process for modeling a structure on a base plate by an additive manufacturing method using metal powder, the structure having a shroud and a hub arranged at intervals in an axial direction of the impeller, a plurality of blades arranged between the shroud and the hub, and a reinforcing member coupled to an impeller outlet side of the shroud and the hub; and a removing step of removing the reinforcing member from the structure.

SUMMARY

Characteristics of conventionally disclosed methods for removing residual power and a support member mainly refer to a unique selection of the powder material, or adding some original manufacturing process. No technique for removal of residual modeling materials from a workpiece having a plurality of openings, nor a technique for easily modeling a temporary closed body for implementing an internal pressure test have been provided.

The present invention is to resolve the above-described problems of the prior art, and object of the present invention is to provide a technique for easily removing modeling materials and implementing pressure test when modeling a workpiece by additive manufacturing method using a 3D printer.

In order to solve the above problems, the present invention provides following modeling method for a workpiece. The first embodiment describes a modeling method for a workpiece additively manufactured using a 3 D printer, when additively manufacturing a workpiece having at least part of which has a hollow region and two or more openings that go through inside and outside of the hollow region, at the same time as laminating the wall section of the hollow region, a configuration that models a temporary closure that blocks at least one opening of the hollow region, a peripheral edge of the temporary closure is joined to the wall section, and the temporary closure has a flow hole that allows fluid to flow in or out of the hollow region, then the temporary closure will be removed after the fluid has flowed in or out.

According to a second embodiment of the present invention, at least a part of the hollow region may be substantially cylindrical.

According to a third embodiment of the present invention, the temporary closure may have a tapered shape in the laminating direction.

According to a fourth embodiment of the present invention, fluid can remove remaining modeling material inside the hollow region.

According to a fifth embodiment of the present invention, a pressure test or decompression test of the inside of the hollow region can be performed by the fluid.

According to a sixth embodiment of the present invention, the temporary closure may have a substantially conical shape, and a flow hole may be formed in a cylindrical boss section provided at the apex thereof.

According to a seventh embodiment of the present invention, the temporary closure may also serve as a support member during additive manufacturing.

According to an eighth embodiment of the present invention, the plurality of openings that are not blocked by the temporary closure may be configured to having holes with an aperture area of 100 mm² or less per hole.

According to a ninth embodiment of the present invention, the temporary closure may have a thickness equal to or smaller than 1 mm.

According to a tenth embodiment of the present invention, it is also preferable that the number of flow holes is smaller than the number of openings blocked by the temporary closure.

Furthermore, an embodiment of the present invention can also provide a formed object of a workpiece in the following manner.

That is, according to an eleventh embodiment of the present invention, a workpiece which is additively manufactured by a 3D printer and at least a part of which has a hollow region, two or more openings connecting the inside and the outside of the hollow region, and a temporary closure that blocks at least one of the openings of the hollow region, in which the temporary closure has a peripheral edge joined to a wall section of the hollow region, and a flow hole through which fluid can flow in or flow out of the interior of the hollow region is provided.

According to an embodiment of the present invention, when additively manufacturing a workpiece at least part of which has a hollow region and two or more openings linking inside and outside of the hollow region by modeling a temporary closure that joins to the wall section of the hollow region, blocking a predetermined opening to form a flow channel. It also facilitates the removal of residual manufacturing material and pressure test of the hollow region.

DETAILED DESCRIPTION OF THE EMBODIMENTS

Hereafter, embodiments of the present invention will be described using the drawings. The present invention can be appropriately implemented within the scope of the claims, but not limited to the following examples.

An additive manufacturing method by a 3D printer is well known. Thus, the description of the method pertaining to this invention will be briefly described so that the users can employ any manufacturing device or manufacturing method.

In the present example, a coater scrapes and laminates the metal power accumulated in a material bucket one layer at a time on a manufacturing stage while a supply elevator raises the bucket. Each layer will be melted based on the data of slices converted into 3D printing mode from 3D-CAD data. Laser beam used for melting sinters exclusively irradiated sections while non-irradiated sections remains as powder. The repetition of the process will additively manufacture a three-dimensional workpiece.

In such additive manufacturing, in a case of a workpiece having a completely closed hollow region, powder from modeling material remains in the interior of the hollow region after the completion of manufacturing, that must be discharged through a flow hole provided for that purpose. In that case, the flow hole will be blocked afterward.

Moreover, if the manufactured workpiece requires a pressure resistance test, air or fluid may be flowed in from the flow hole to implement the test.

When a workpiece has more complex shape, a hollow region and two or more openings linking inside and outside, removal of manufactured materials and pressure test will face a challenge that sufficient pressurization or resistance cannot be obtained as flowed in fluid from an opening may flow out from another opening.

In particular, a workpiece where a plurality of small-diameter openings are arranged, the process becomes complicated because it is difficult to block these openings.

Figure 1A:
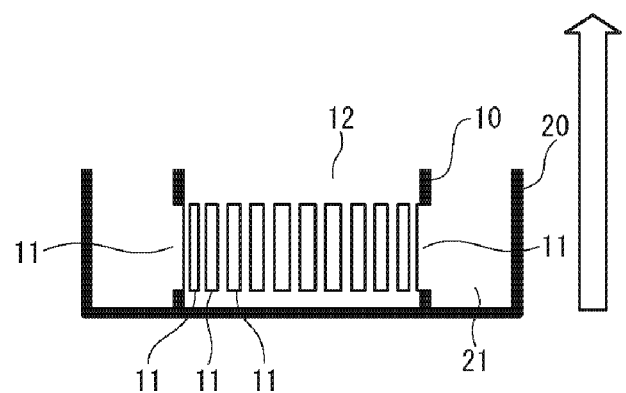
FIGS. 1A to 1C are explanatory drawings that illustrate processes of a modeling method for a workpiece according to an embodiment of the present invention.
Figure 1B:
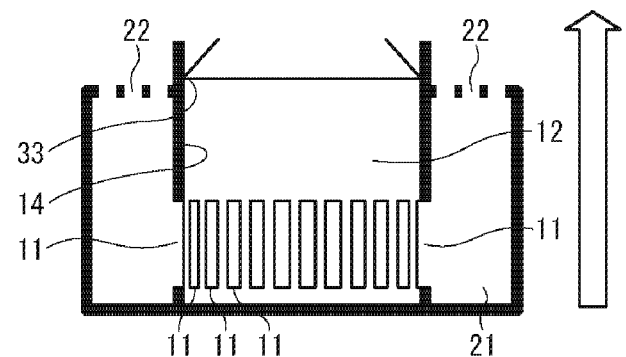
Figure 1C:
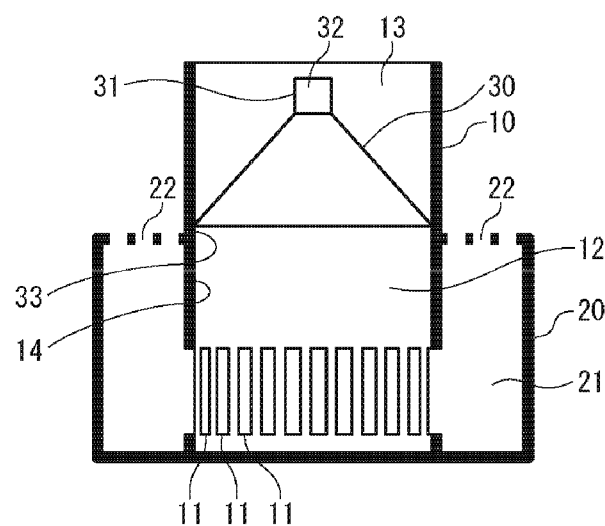

FIGS. 1A to 1C are explanatory drawings that illustrate processes of the modeling method for a workpiece according to the present invention. As shown in FIG. 1C, the present example will be illustrated by using a workpiece sample including a small cylindrical section (10) in a cylindrical shape, and a large cylindrical section (20) having a cylindrical shape concentrically around its lower section. A plurality of slit type openings (11) are formed between the small cylindrical section (10) and the large cylindrical section (20), and a hollow region (12) inside the small cylindrical section (10) and a hollow region (21) inside the large cylindrical section (20) are connected. In addition, a plurality of small openings (22) are also provided on the upper surface of the large cylindrical section (20).

When this workpiece is additively manufactured, layers are laminated one after another from the bottom as shown in FIGS. 1A and 1B. Thus, the hollow regions (12) and (21) are filled with the powder of modeling material. The openings (11) and (22) are filled with the powder as well.

Even when such a workpiece is taken out from the manufacturing stage, a large amount of powder remains in the internally partitioned hollow regions and removal thereof is difficult. For instance, since the upper side of the small cylindrical section (10) has a large opening (13), powder cannot be discharged from small openings (22) by simply flowing in air or cleansing liquid from upper side. It is difficult to increase pressure unless the opening is covered with an appropriate seal member and connected with a hose.

Conventionally, it has been necessary to prepare a dedicated jig, such as a cover, a rubber stopper, or a coupler made to fit this section, and sometimes that has to be brazed prior to removing modeling material or implementing a pressure test.

Since the process is complicated and costly, the present invention proposes integrally form a temporary closure (30) inside the small cylindrical section (10) during 3D printing.

As illustrated in the drawing, the temporary closure (30) has a substantially conical shape, and a cylindrical boss section (31) that is provided at the apex. A flow hole (32) is formed inside the boss section (31).

The temporary closure (30) is formed by joining a bottom of an inner wall (14) of a wall section of the small cylindrical section (10) in such a manner that the large opening (13) is blocked.

As illustrated in FIG. 1B, the temporary closure (30) is formed at the same time as laminating the wall section.

The temporary closure has a substantially conical shape since the temporary closure is preferably formed at an inclination angle of 45 degrees or more in such a manner that any support member is not required during laminating. Thus, this is not a case where some support member is used. Further, although the present invention is particularly preferable to be applied to workpieces having a substantially cylindrical hollow region, the shape of the hollow region is arbitrary. For example, a spherical shape or an irregular shape can be applied. When it has a substantially cylindrical shape, its cross-section is not limited to have a cylindrical shape, but an arbitrary cross-sectional shape. In that case, it can be a spindle shape or the like corresponding to the cross-sectional shape.

Figure 2:
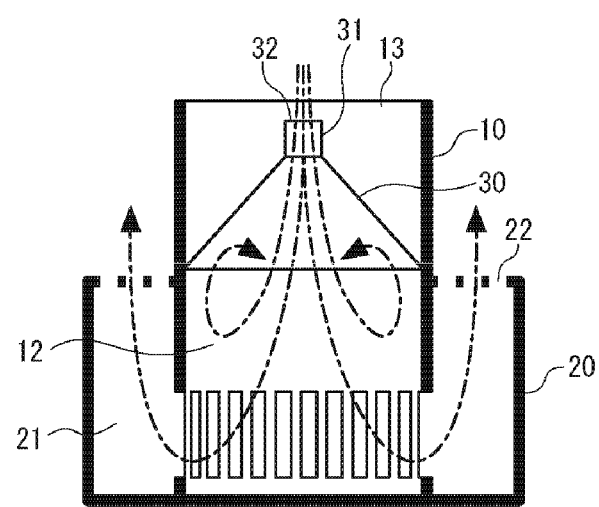
FIG. 2 is an explanatory drawing that illustrates how to remove residual material according to the embodiment of the present invention.
Figure 3:
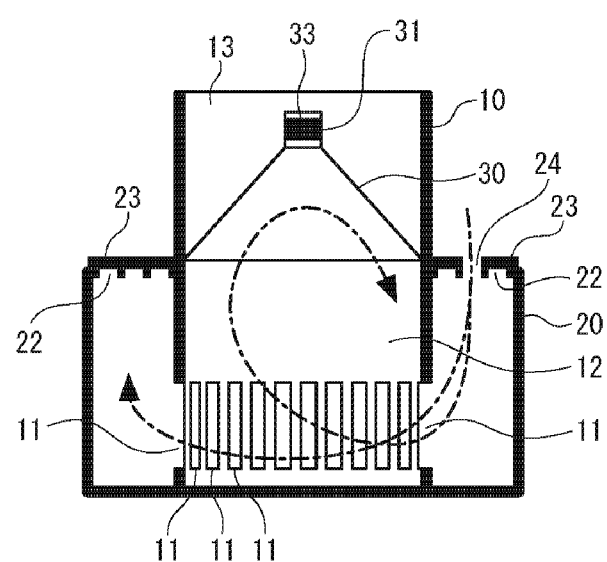
FIG. 3 is an explanatory drawing that illustrates a pressure test according to the embodiment of the present invention.
Figure 4A:
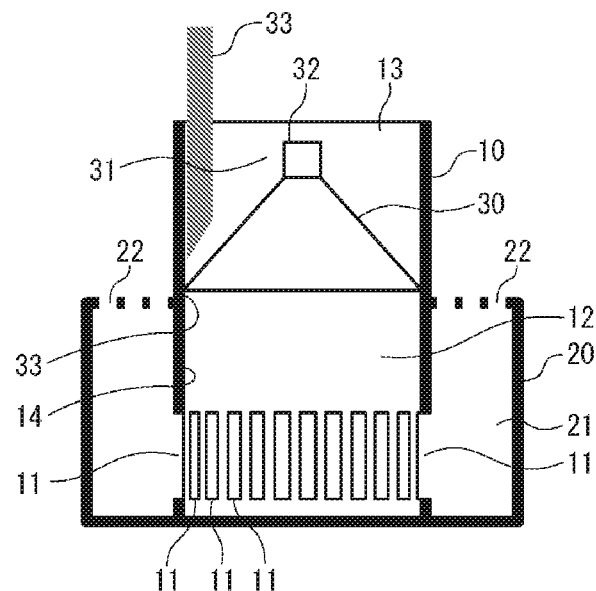
FIGS. 4A and 4B are explanatory drawings that illustrates how to remove a temporary closure according to the embodiment of the present invention.
Figure 4B:
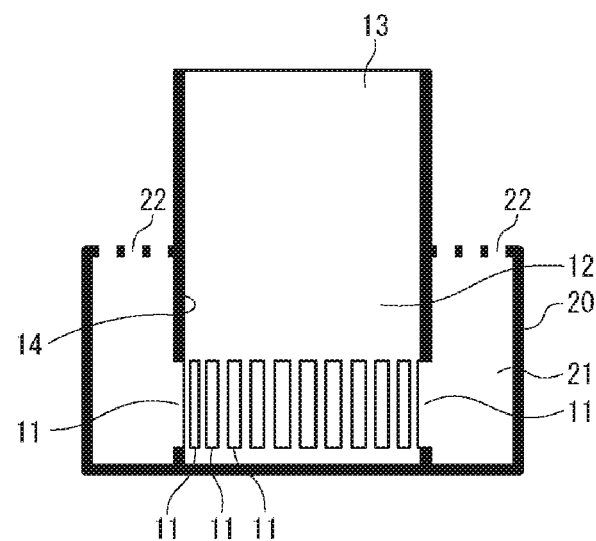
Figure 5:
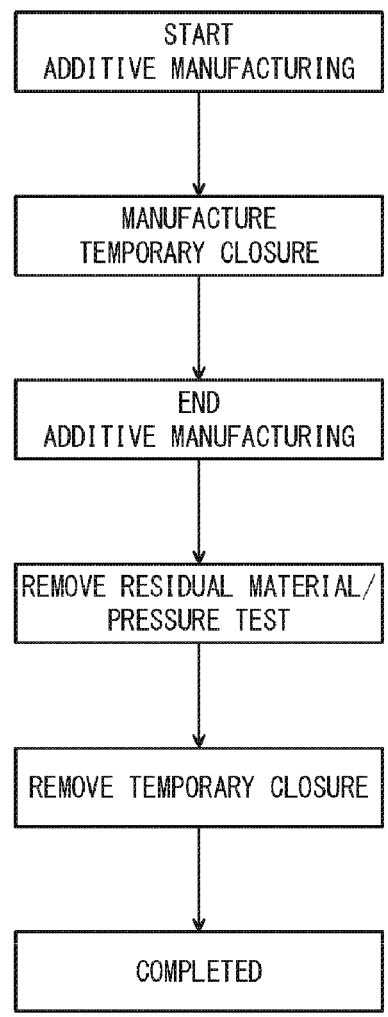
FIG. 5 is a flowchart of the modeling method for a workpiece according to the embodiment of the present invention.

FIG. 2 is an explanatory drawing that illustrates how the residual material is removed according to the embodiment of the present invention, FIG. 3 is also an explanatory drawing that illustrates an aspect of the pressure test, FIGS. 4A and 4B are explanatory drawings that illustrates how the temporary closure is removed, and FIG. 5 is a flowchart of the modeling method for the workpiece according to the present invention. The processes of the present invention will be described referring to these drawings.

According to the present invention, the temporary closure (30) is manufactured together with the workpiece from the start to the end of the additive manufacturing, whereby the temporary closure (30) suitable for the removal of the residual material and the pressure test is performed simultaneously during 3D printing.

Thus, as illustrated in FIG. 2, a nozzle of fluid such as cleansing fluid is connected to the boss section (31), and the cleansing fluid is flowed in through the flow hole (32).

At this time, since the large opening (13) of the small cylindrical section (10) is blocked by the temporary closure (30), only the openings (11) and (22) serve as outlets from the lower side of the internal region, and the cleansing fluid flows out of the opening (22) through a path illustrated in FIG. 2 at a high pressure or a high flow rate.

As a result, since the residual material is effectively removed also from corner sections and the openings (11) and (22) of the hollow regions (12) and (21), the quality of the workpiece will be improved, modeling method will be simplified, and processing cost will be reduced.

Alternatively, when implementing a pressure test of the interior of the hollow region of a workpiece having a plurality of openings according to the present invention embodiment, blocking a plurality of openings is complicated.

Instead, it is possible to implement a pressure test using the temporary closure (30). For example, the opening (22) can be sealed with a cover and pressurized by injecting fluid through the flow holes (32).

Similarly, this method can be applied to decompression test by changing the flow of the fluid. For example, decompression may be implemented by suction of air from the flow hole (32) of the temporary closure (30) while blocking the opening (22) with a cover.

Alternatively, as illustrated in FIG. 3, it is possible to implement a pressure test by blocking the flow hole (32) of the temporary closure (30) with a cap (33) and flowing in a fluid from a pressurization hole (24) provided on a part of a cover (23) of the opening (22). This cover (23) can be also additively manufactured by a 3D printer as one of the temporary closure (30).

As is clear from the drawing, inflow and outflow of the fluid in FIG. 3 are in opposite direction to those illustrated in FIG. 2. In the embodiment of the present invention, the inflow and outflow can be reversed depending on a process or section to be tested.

As illustrated in FIGS. 4A and 4B, after the removal of the residual material or the pressure test are completed, the temporary closure (30) will be removed by a milling machine (33) or the like according to the modeling method of the present invention.

An aspect of finished workpiece after the removal is illustrated in FIG. 4B.

In order to facilitate the removal of the temporary closure and to save materials, the thickness of the temporary closure (30) is preferably a thin plate of a thickness equal to or smaller than 1 mm. Further, the thickness may be increased for the connecting section with the inner wall (14) and the boss section (31).

The temporary closure (30) can also be served as a support member during the additive manufacturing. In the additive manufacturing method by a 3D printer, a conditioning based on the shape, and a support member to prevent deformation may be required.

Thus, if the temporary closure (30) of the present invention is also served as a support member, more efficient manufacturing can be achieved. For example, the temporary closure (30) in the above example is provided in the middle of the longitudinal cylindrical shape which contributes to the prevention of deformation in vertical direction and retention of cross-sectional shape.

When providing the closure of the present invention, it is specifically preferable to apply it to a workpiece having a plurality of small openings.

As described above, in case a plurality of the openings are provided, it is not only difficult to block all of them, materials are prone to remain in the openings having small opening area. In that case, the internal space can be efficiently blocked by providing the temporary closure to a suitable position.

Specifically, the effect of the present invention is particularly performing when the opening that is not blocked by the temporary closure having an opening with an aperture area equal to or smaller than 100 mm$^2$, particularly 40 mm$^2$ or smaller.

The embodiment of the present invention can be also provided in the form of a workpiece including the above-described temporary closure.

Figure 6A:
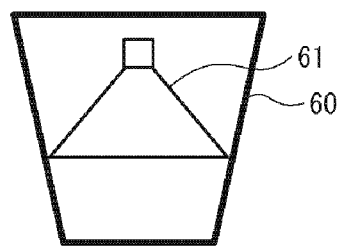
FIGS. 6A to 6C are explanatory drawings that illustrates various examples of the temporary closure.
Figure 6B:
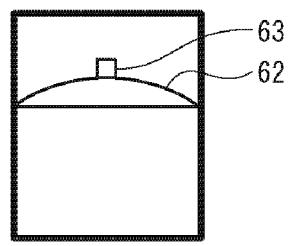
Figure 6C:
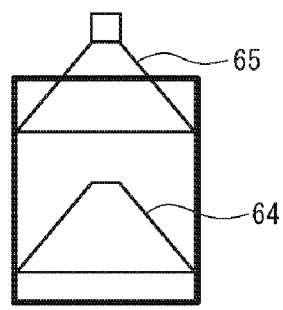

As another example, explanatory drawings showing various examples of the temporary closure are illustrated in FIGS. 6A to 6C.

FIG. 6A is an explanatory drawing illustrating a shape (60) of a workpiece that has a cross-sectional area in a substantially cylindrical shape that is not uniform, but becomes wider upward. As described above, the substantially cylindrical shape includes all workpieces at least partly having a hollow region surrounded by the wall section. The top and bottom may be either blocked or opened, and the opening according to the present invention may be provided at any position.

FIG. 6B is an explanatory drawing illustrating another example of the shape of the temporary closure (62), having a curved shape expanding upward, not a spindle shape and provided with a boss section (63) at the upper end thereof. In the embodiment of the present invention, it is specifically preferable that the temporary closure is tapered (has a small diameter when sliced) upward, however, any shape can be applied.

The boss section can be provided not only at the upper end, but also, at any other easily accessible place from the outside, for instance.

FIG. 6C is an explanatory drawing illustrating a configuration comprising two or more temporary closing bodies (64) and (65). Depending on the position of openings, in order to effectively close an internal region, it can be partitioned into three or more sections along the substantially cylindrical shape. In a case the two or more temporary closing bodies are provided, the boss section may be provided on only one temporary closure.

The scope of the invention is not limited to the above-mentioned embodiments. Various modifications and changes are possible within the scope of the subject matter of the invention.

What is claimed is:

1. A modeling method for a workpiece to be additively manufactured by a 3D printer, comprising the following steps of:
    additively manufacturing the workpiece, wherein at least a part of the workpiece has a hollow region and two or more openings, and the two or more openings link the hollow region and an inside and outside of the hollow region,
    additively manufacturing a temporary closure blocking at least one of the two or more openings of the hollow region at a same time as additively manufacturing a wall section of the hollow region,
    joining a peripheral edge of the temporary closure to the wall section,
    wherein the temporary closure has a flow hole allowing a fluid to flow in or out of the hollow region, and
    after the fluid has flowed in or out, then the temporary closure is removed.

2. The modeling method according to claim 1, wherein at least a part of the hollow region is cylindrical.

3. The modeling method according to claim 1, wherein the temporary closure has a tapered shape in a laminating direction.

4. The modeling method according to claim 1, wherein a remaining modeling material inside the hollow region is removed by the fluid.

5. The modeling method according to claim 1, comprising a step of implementing a pressure test or a decompression test of the inside of the hollow region by the fluid.

6. The modeling method according to claim 1, wherein the temporary closure has a conical shape, and the flow hole is formed in a cylindrical boss section provided at an apex of the cylindrical boss section.

7. The modeling method according to claim 1, wherein the temporary closure also serves as a support member during the step of additive manufacturing.

8. The modeling method according to claim 1, wherein the two or more openings not blocked by the temporary closure is provided with holes, wherein each of the holes has an opening area equal to or smaller than 100 mm$^2$.

9. The modeling method according to claim 1, wherein a thickness of the temporary closure is equal to or smaller than 1 mm.

10. The modeling method according to claim 1, wherein a number of the flow holes is less than a number of the two or more openings closed by the temporary closure.

11. The modeling method according to claim 2, wherein the temporary closure has a tapered shape in a laminating direction.

12. The modeling method according to claim 2, wherein a remaining modeling material inside the hollow region is removed by the fluid.

13. The modeling method according to claim 3, wherein a remaining modeling material inside the hollow region is removed by the fluid.

14. The modeling method according to claim 2, comprising a step of implementing a pressure test or a decompression test of the inside of the hollow region by the fluid.

15. The modeling method according to claim 3, comprising a step of implementing a pressure test or a decompression test of the inside of the hollow region by the fluid.

16. The modeling method according to claim 2, wherein the temporary closure has a conical shape, and the flow hole is formed in a cylindrical boss section provided at an apex of the cylindrical boss section.

17. The modeling method according to claim 2, wherein the temporary closure has a conical shape, and the flow hole is formed in a cylindrical boss section provided at an apex of the cylindrical boss section.

18. The modeling method according to claim 2, wherein the temporary closure also serves as a support member during the step of additive manufacturing.

19. The modeling method according to claim 3, wherein the temporary closure also serves as a support member during the step of additive manufacturing.

* * * * *